Feb. 18, 1941.                F. W. DANE                2,232,096
                         RADIO DIRECTION FINDER
                          Filed May 7, 1940            2 Sheets-Sheet 1
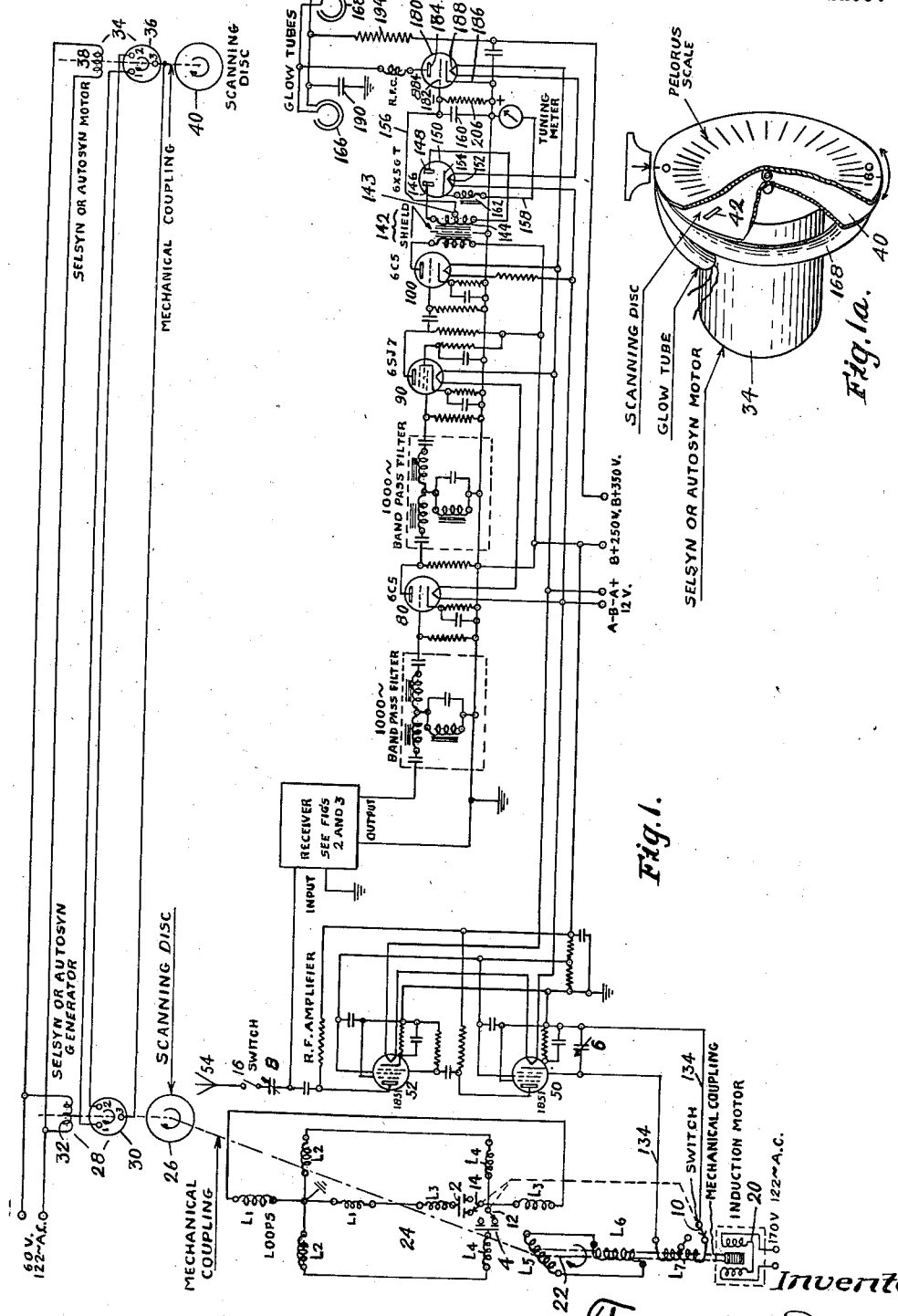

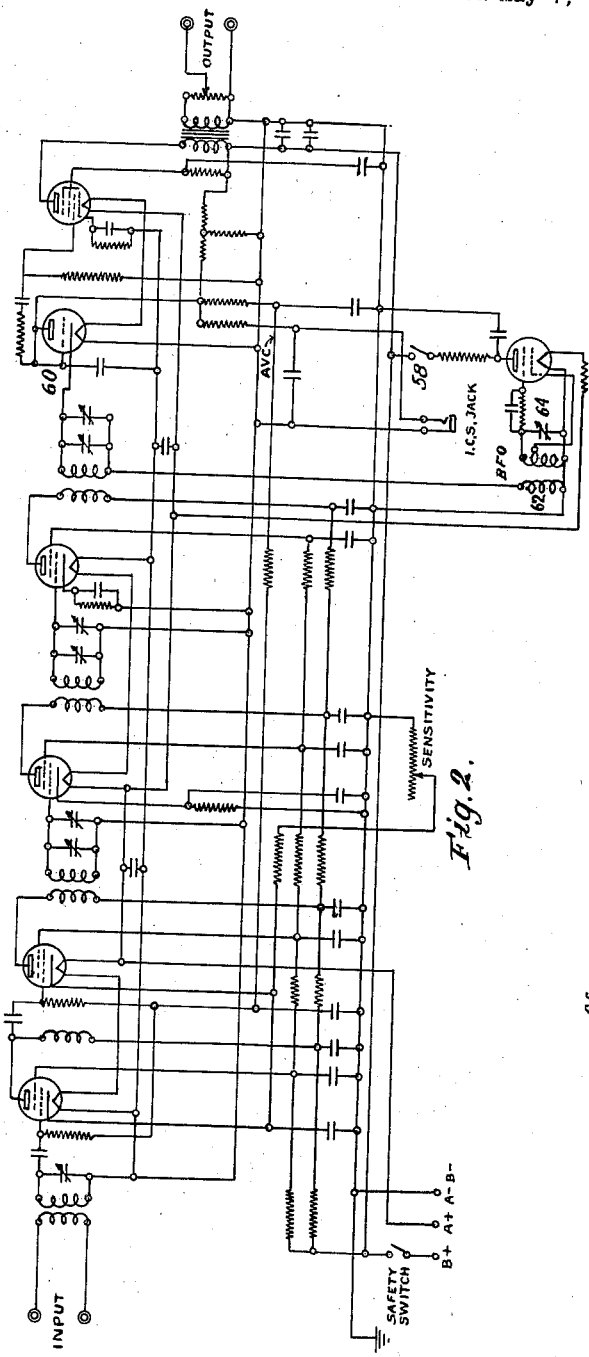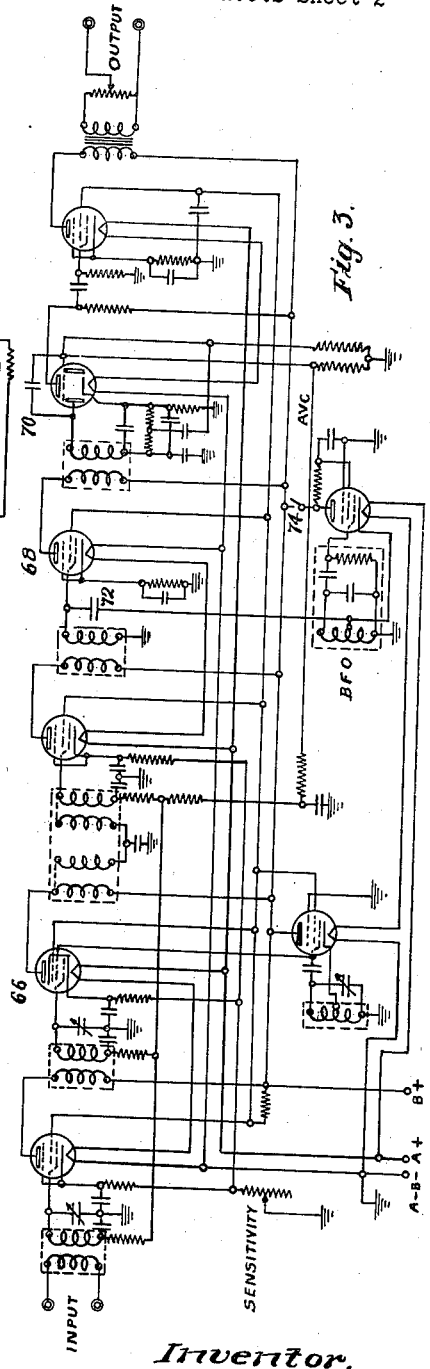

Patented Feb. 18, 1941

2,232,096

UNITED STATES PATENT OFFICE 2,232,096

RADIO DIRECTION FINDER

Francis W. Dane, Marblehead, Mass.

Application May 7, 1940, Serial No. 333,728

23 Claims. (Cl. 250—11)

This invention relates to a radio direction finder of the type which produces a visual indication of the direction of a radio transmitter to which the finder is tuned. The instrument is adapted to be carried on aircraft or vessels but it may also be used at a stationary location for determining the position of aircraft in flight or ships at sea.

The system consists in general of a loop and goniometer circuit, a radio receiver, an indicator-operating circuit and a viewing and reading device. The goniometer and loop circuit is founded upon the well-known Bellini Tosi method of direction fiinding, employing two loops at right angles to each other. Two antennae at right angles to each other, similar to the Adcock system of direction finding, might also be used. The system herein disclosed is especially advantageous for use on aircraft because its design and construction is such that fixed loops of small size can be employed, thus reducing the wind resistance as compared with rotating loops or even fixed loops of large size. For ships and fixed stations, however, a continuously driven rotating loop antenna could be used instead of the crossed loops and goniometer.

The system employs an antenna coupling unit similar to the Bellini Tosi goniometer, but having a constantly rotating search coil which impresses upon the radio receiver two maximum and two minimum signals at each rotation of the coil. This may be combined with the signal of an auxiliary antenna so that one of these minima in each revolution is suppressed. The resultant signal is amplified and detected by the radio receiver and fed to the indicator operating circuit, which includes a selective amplifier, a rectifier, a filter, and a relay or trigger tube the plate circuit of which is especially adapted to operate a visual electrical indicator. The indicator operating circuit functions in such a manner that the said indicator is operated, giving off a short sharp flash of light, at the moments of minimum signal.

The visual indicator may be a neon bulb, or other sensitive light bulb which gives off no appreciable after-glow, carried by a viewing device including a rotating arm or disk, driven in synchronism with the rotating search coil of the goniometer, or the indicator may be, and is preferably, an annular neon glow lamp viewed through an aperture or slit in a viewing device including a rotating scanning disk which is driven in synchronism with the search coil. The speed of rotation should be sufficient to cause a succession of flashes sufficiently rapid to appear to the eye as a continuous glow or spot of light, on account of persistence of vision. The location of this spot with respect to a dial scale, which may be conveniently graduated in degrees, indicates the direction of the transmitter.

The foregoing outlines in general the organization and function of the apparatus embodying my invention. The function of the various parts of my invention is best understood in connection with the drawings which illustrate one form of direction finder constructed according to the invention, in which:

Fig. 1 is a general circuit diagram of the direction finder;

Fig. 1a is a perspective view, partly broken away, of the electrical indicator and associated viewing device diagrammatically shown in Fig. 1;

Fig. 2 is a circuit diagram of a radio receiver which may be used with the system shown in Fig. 1; and Fig. 3 is a circuit diagram of another type of radio receiver which may be used with the system shown in Fig. 1.

Referring to Fig. 1, the signal is picked up in the loops $L_1$ and $L_2$ which are at right angles to each other and suitably located for the reception of radio signals. Each loop is shown in two sections to facilitate the representation of the electrical connection of the midpoint of the two loops. This connection may be grounded, as shown, thus giving both loops a balanced relation to ground. Wires connect the extremities of the loops $L_1$ and $L_2$ with the field coils of the goniometer $L_3$ and $L_4$, respectively, which are also disposed at right angles to each other. The coils $L_3$ and $L_4$ are wound in two sections, a switch and condenser being interposed in series between the two halves of each coil. The switch permits the change of the condenser capacitance in use to a different value, thus effecting a certain degree of tuning, as further explained below. The signal current picked up in the loops $L_1$ and $L_2$ produces in the field coil of the goniometer a field similar to that in which the loops are situated. $L_5$ is the continuously rotating search coil of the goniometer which, as it traverses the field set up by coils $L_3$ and $L_4$ produces a constantly varying signal, which is at a maximum when the axis of the coil is at right angles to the plane in which the composite field of $L_3$ and $L_4$ is at a maximum and is at a minimum when the coil axis lies in that plane. This results in two signal maxima and two signal minima per revolution of the search coil $L_5$. The unit consisting of the fixed coils $L_3$ and $L_4$ and the rotating coil $L_5$ is herein referred to as a goniometer. Instead of this type of goniometer, which operates electromagnetically, an electrostatic goniometer with two fixed pairs of plates and one rotating pair of plates might be used, although the former device is preferred.

The output of the rotating search coil $L_5$, which picks up the radio signal with an amplitude varying with its orientation, is passed into an energy transfer means adapted to transfer the signal energy from the coil $L_5$ to the first tube 50 of the amplifier. This energy transfer means consists of two coils $L_6$ and $L_7$ inductively coupled to each other. The output of the rotating coil $L_5$ is fed into the input coil $L_6$ of the energy transfer means. The coil $L_6$ rotates on the same shaft 22 as $L_5$, but is coaxially disposed with respect to the shaft 22, whereas the axis of $L_5$ is transverse thereto. The output coil $L_7$ of the energy transfer means is coaxial with the input coil $L_6$, but is fixed and independent of shaft 22. The output delivered from the coil $L_7$ is led through the wires 134 to an amplifier which feeds the signal to a radio receiver. The coil $L_7$ is further provided with a tap and a switch 10 which is ganged (mechanically coupled) with the switches 12 and 14 of the goniometer. These switches may be used to shift the optimum operation of the goniometer from one group of radio frequencies to another group of frequencies, as from 250 kc. to 500 kc.

The goniometer is shown as being driven by an induction motor 20 by means of the shaft 22. The shaft 22 is mechanically coupled, as by a flexible shaft 24, to a scanning disk 26 associated with an electrical indicator, in this case a neon glow tube 166, and also to the armature 30 of an "autosyn" or "selsyn" generator 28. The current set up in the armature 30 is used to drive an "autosyn" or "selsyn" motor 34 and its associated scanning disk 40 in synchronism therewith, thus providing in conjunction with the glow tube 168 a "repeater" viewing device.

The method of transferring the goniometer output to the radio receiver by means of the inductive coupling between the fixed coil $L_7$ and the axially rotating coil $L_6$ is a substantial improvement over previous methods which required the use of brushes and contact surfaces. The use of brushes introduces considerable noise into the radio receiver, greatly interfering with the sensitivity and accuracy of the direction finder.

The direction finding antenna system may be simplified, at the expense of introducing certain other difficulties, especially in the case of a fixed or marine installation, by omitting the loops $L_1$ and $L_2$ and their associated coils $L_3$ and $L_4$ and substituting for the rotating coil $L_5$ a rotating loop antenna. The rotation of the entire antenna in this fashion, however, would introduce an error into the readings due to the fact that the error arising out of the influence of neighboring objects on the antenna will vary with the position of the antenna. When fixed loops are used in connection with a goniometer unit, however, a single correction independent of the position of the coil $L_5$ will suffice in this respect. Furthermore, more machinery is likely to be necessary to rotate a loop antenna of sufficient size to provide reasonable signal strength, than is necessary to rotate the search coil of a goniometer unit.

The varying signal is fed from coil $L_7$ to a radio frequency amplifier shown in Fig. 1 as consisting of two stages, a tuned stage employing the vacuum tube 50 and tuned by the variable condenser 6 and an untuned stage employing the vacuum tube 52. If the receiver used should contain sufficient radio amplification one or both of these amplifier stages may be omitted. For convenience it may be desirable to couple mechanically the rotation of the tuning condenser 6 with the main tuning control of the receiver.

Both radio frequency amplifier stages as shown use vacuum tubes of the type known as "No. 1851." Resistance coupling is shown connecting the two radio frequency amplifier stages and connecting the output of the second radio frequency amplifier stage to the input of the receiver. Also connected to the input of the receiver, more particularly to the terminal of the input which is not grounded, is an antenna 54. Interposed between the input of the receiver and the antenna 54 are a variable condenser 8, for the purpose of tuning the antenna and adjusting the antenna coupling, and a switch 16 for the purpose of disconnecting the antenna when this is desired. When the antenna is disconnected the signal in the receiver goes through two minima for each revolution of the coil $L_5$ resulting in the indication on the viewing device of two points of light 180° apart. When the antenna is connected, however, one of these signal minima is suppressed so that only one point of light appears, thus determining the "sense" as well as the line of direction of the incoming signal. This use of an auxiliary antenna for sense determination is well known in the art. It is the practice with some direction finding apparatus that has been tried to take a reading of the direction only first and then by turning a switch to introduce the auxiliary antenna to determine sense. The switch 16 may be used for this purpose, although it is not necessary with my improved direction finder to employ any such procedure, since accurate readings may be obtained with it with the auxiliary antenna connected at all times.

The radio receiver is indicated in Fig. 1 simply as a large square with input and output leads. A number of types of receivers might be used and two suitable types of receivers are shown by way of circuit diagrams in Fig. 2 and Fig. 3 respectively.

Fig. 2 shows a receiver of the "tuned radio frequency" ("T. R. F.") type and Fig. 3 shows a receiver of the heterodyne type. The construction of such receivers is well known and will not be described except in connection with certain features important for use in the direction finding system herein described. Care should be taken to select a receiver with adequate sensitivity and freedom from tube noise and other circuit disturbances. The automatic volume control circuits of most commercial receivers are generally satisfactory for the system herein described.

Since, for the purpose of determining the location of the radio transmitting station, after the station is identified, it is not necessary to detect the speech modulation or other modulation of the signal, in this system of radio direction finding provision is made for amplifying and detecting the carrier wave energy itself rather than any modulation thereof. This is accomplished by the use of a beat frequency oscillator, the energy of which, when combined with the signal and detected, produces a beat frequency signal. The beat frequency oscillator may be adjusted so that the beat frequency is some particular frequency such as 1000 cycles or some other suitable frequency. This has the advantage that the amplifier may be made highly selective as to frequency, thus excluding most extraneous noises.

The beat frequency oscillator circuit is marked in Fig. 2 and in Fig. 3 with the symbol "BFO." It is provided with a switch (58 in Fig. 2 and 74 in Fig. 3) for disabling the beat frequency oscillator when it is desired to listen to the modulation of the signal for the purpose of identifying the transmitting station (this would be accomplished by means of a listening device connected across the normal output of the receiver, which may be done without stopping or disconnecting the goniometer, although the signal is somewhat clearer if it is so stopped or disconnected).

The beat frequency oscillator, which is a vacuum tube oscillator with a suitable frequency of oscillation, may be coupled to the receiver in a number of ways, such as to the plate, or the control grid or a special injection grid on the vacuum tube in the receiver which is designed as the detector. The beat oscillator output may also be introduced at an earlier stage, even at the input, which would be convenient if it was desired not to alter the connections of an already built receiver, but in that case the intervening amplifying stages of the receiver must be unselective enough to amplify both the signal and the oscillator output (these being of different frequency, differing by the frequency of the desired beat).

In Fig. 2 the beat frequency oscillator is shown coupled to the grid circuit of the detector stage of the receiver. In Fig. 3 the beat frequency oscillator is coupled to the grid circuit of the amplifier next preceding the detector stage. In Fig. 2 the coupling is inductive through the coil 62, while in Fig. 3 it is capacitive, through the condenser 72.

In Fig. 2, the signal frequency fed into the detector stage is of the original radio frequency, and hence the beat frequency oscillator must be tuned to a radio frequency differing from that of the received signal by a predetermined amount corresponding to the desired beat frequency. This ordinarily requires a variable condenser, such as is shown at 64, to tune the oscillator. It is usually convenient and desirable to mechanically coordinate the tuning of the condenser 64 as well as the tuning of the condenser 6 (Fig. 1) with the main tuning control of the receiver.

A separate oscillator circuit is not necessary to produce a beat frequency since the oscillator and detector may be combined in the well known oscillating regenerative detector circuit. This, of course, would require an amplifying type of detector rather than the diode type of detector circuit illustrated in Fig. 2 and Fig. 3.

In the heterodyne type of receiver shown in Fig. 3 the original signal is converted, as is well known, to a signal of a predetermined intermediate frequency in the first detector stage 66. The beat frequency oscillator may, therefore, be adjusted to a frequency bearing the desired relation to this intermediate frequency and need not be tuned further when the radio receiver is tuned to bring in different signals.

Other types of receiving systems may also be used. For instance, instead of tuning the receiver the receiver might be adjusted at a fixed frequency, and a heterodyne converter used between the radio frequency amplifier 50, 52 and the receiver input to convert the signal to the predetermined frequency. The heterodyne converter may be a single tube affair using an "autodyne" circuit with a "pentagrid converter" tube 5 or the like, or it may be a mixer (first detector) stage provided with a separate oscillator.

Instead of using a single receiver for both listening to the signal and operating the visual direction indicator, separate receivers might be used. In this event, the receiver used in the direction finding system, if of the heterodyne type, need not include any second detector to produce an audible frequency and the ampifier employing the tubes 80, 90 and 100 may be tuned to the intermediate frequency used in the receiver, and may also be incorporated in the receiver.

Instead of using a beat frequency oscillator one may make the carrier audible by modulating it with an audio frequency in one of the first stages of the receiver. This would be less satisfactory than the use of a beat frequency oscillator since it would lower the average carrier energy delivered to the following stage, whereas where a beat frequency oscillator is used the carrier may be amplified at the maximum amplification capability of the tubes during the entire time it is being received.

Referring again to Fig. 1, the indicator-operating circuit will next be explained and described.

The output of the receiver, which is an audio frequency tone of some definite frequency, for instance 1000 cycles, varying continuously in amplitude in accordance with the goniometer output, is next amplified in a selective amplifier, shown as consisting of three stages. The selectivity of the amplifier is accomplished by coupling the receiver output to the first stage and also the first to the second stage through a band pass filter fixed-tuned to a frequency of 1000 cycles. This filter rejects sounds of other frequencies, extraneous noise, and the like. The second stage is shown coupled to the third stage by a simple resistance coupling. The types of vacuum tubes used in this particular embodiment of the invention are noted on Fig. 1.

The third stage of the selective amplifier just described is coupled to a rectifier 150 by means of a transformer 142 which is preferably provided with a shield as shown. The rectifier 150 is of the full wave type, with two plates 146 and 148 each connected to one end of the secondary 144 of the transformer 142, and accordingly the secondary 144 is provided with a center terminal 143 which is connected by a wire 156 to form the electro-negative side of the output of the rectifier. The cathode 154 of the tube 150 forms the positive terminal of the rectifier output. The rectifier output is then passed through a filter circuit consisting of a choke 162, a condenser 160 and a resistor 206.

The alternating signal current in the secondary 144 tends to produce in the output circuit of the rectifier a series of pulses all in the same direction, each pulse corresponding to a half cycle of the alternating current, and would produce pulses of that type if the filter circuit were not interposed. The filter circuit acts to smooth out such variation in the rectified current and thus prevents the rectified signal current and the corresponding voltage from dropping to or near zero while the alternating signal current is changing from one direction to the other.

In the filter circuit is interposed a tuning meter for the purpose of facilitating tuning and to enable any errors due to variations in average signal level in the audio amplifier to be eliminated by making readings at a given average signal level.

The filtered rectifier output is fed to the grid circuit of a relay or trigger tube 180 in such a way that the negative side of the rectifier-filter output is connected with the grid or control electrode 182 and the positive side with the cathode 186 of the tube 180. Since the grid-cathode resistance inside the tube is high, most of the rectified current will flow through the resistor 206 thus building up a voltage which is negatively impressed on the grid 182 of the relay tube 180. The resistor 206 is also a part of the filter and permits the charge of condenser 160 to dissipate itself, or leak off, relatively promptly when the signal disappears or reaches a very low value, thus causing the negative potential of the grid to decrease and causing the relay or trigger tube 180 to become conductive and in turn cause the electrical indicator glow tubes 166 and 168 to be ignited, as described below.

The tube 180 is preferably a gaseous conduction type of tube such as the "type 884" which is now commonly used in oscilloscope sweep circuits. The plate cathode space of this tube constitutes a practical open circuit when the grid has a negative potential with respect to the cathode greater than a certain value, under which conditions the tube is said to be "blocked." When this negative potential decreases below the critical value the tube becomes conducting and readily conducts current from the cathode to the plate.

When there is a signal being received in the radio receiver, and rectified and filtered in the succeeding circuits, the comparatively steady negative voltage impressed on the grid 182 keeps the tube 180 in blocked condition. This enables a condenser 190 in the plate circuit of the tube 180 to be charged by the power supply indicated by the symbol "B+350V." through the resistance 194. When the moment of signal minimum appears, however, which occurs once for every revolution when the "sense" antenna is used (or twice when not used) of the coils L₅ and L₆ and of the scanning disks 26 and 40, the negative voltage between the grid 182 and the cathode 186 is reduced to a minimum value, which may be zero, and which is at any rate below the critical value, thus causing the tube 180 to become conducting. This allows the condenser 190 to discharge through the neon glow tubes 166 and 168. As the coil L₅ continues to revolve the signal reappears and promptly causes the tube 180 to be blocked again, allowing the condenser to be recharged, so that when the next signal minimum appears another flash may be produced.

The choke RFC is a radio frequency choke for the purpose of suppressing any radio frequency oscillations that may tend to arise from the firing of the control tube 180.

The magnitude of the filter elements, that is, the choke 162, the condenser 160 and the resistance 206, desirable for adequately smoothing out the variations in the rectifier output (in the system described these variations will be chiefly 2000 cycle per second variations) without appreciably affecting the appearance of the periodic signal minimum in response to the rotation of the coil L₅, varies with the frequency of the signal fed to the rectifier. For a frequency of 1000 cycles a choke of between 15 and 200 henries, condenser of about .001 microfarad and a resistance of about 150,000 ohms is satisfactory. For an appreciably higher frequency the inductance of the choke and the capacitance of the condenser may be reduced. In fact it is conceivable that for very high frequencies the inductance and capacitance inherent in the circuit may be sufficient to provide the necessary filtering action, although at present the use of such high frequencies is not practical because of the inefficiency of present day amplifiers at such frequencies.

Other more complicated filters, such as multi section filters employing more than one choke or more than one condenser, may be used, although the simple filter here shown is fully adequate to provide the necessary smoothing effect on the output of the rectifier. A "condenser input" type of filter may be used, as well as the "choke input" type shown.

If it should be desired to eliminate the choke 162, for instance, for the purpose of saving weight or space or for other reasons, adequate filtering may be obtained by using a suitable "pi section" capacitance-resistance filter. This may be done in connection with the system shown in Fig. 1 by eliminating the choke 162 and connecting the cathode 154 directly to the tuning meter, inserting a resistor in the lead 156 between the condenser 160 and the center tap 143 of the secondary 144 of the transformer 142 and connecting another condenser between the center tap 143 and ground. For the system shown in Fig. 1 which employs a 1000 cycle signal in the final selective amplifier, this resistor and condenser may be of a magnitude of 15000 ohms and .01 microfarad respectively.

For any given frequency or restricted range of frequencies applied to the rectifier, a fair degree of variation may be made in the values of choke, condenser and resistance used in the filter. A fine adjustment of these values is not necessary, but the range of selection of these values is nevertheless limited, for if the filtering action is insufficient the tube 180 will not remain blocked during "signal on" periods, thus interfering with the proper charging of condenser 190, as well as possibly giving spurious indications in the glow tubes. On the other hand, if the filtering action is too great, which will only happen if unusually large chokes or condensers are used, the sharpness and depth of the current dip in response to signal minima in coil L₅ will be adversely affected. This limit is theoretical rather than practical because of the large size of choke and condenser that would be necessary to produce any such adverse effect. These two extreme conditions leave a considerable range of satisfactory values between them.

Fig. 1a illustrates one of the viewing devices used in the system shown diagrammatically in Fig. 1. In Fig. 1 two viewing devices are shown, one composed of the glow tube 166 and the directly mechanically driven scanning disk 26, which is driven by the flexible shaft 24 which also drives a "selsyn" or "autosyn" generator 28, and another composed of the glow tube 168 and the scanning disk 40, driven by the "selsyn" or "autosyn" motor 34. The latter viewing device is the one illustrated in Fig. 1a. The glow tube 168 is annular in shape. Its ends overlap so that when it is ignited a continuous ring of light, without gaps, will be formed.

An aperture in the form of a slit 42 is provided in the scanning disk which revolves in front of the glow tube 168 as the disk turns. When the glow tube is ignited, therefore, only a spot of light is seen through the scanning disk. A pelorus scale consisting of a fixed transparent or translucent disk carrying scale marks is shown in Fig. 1a mounted in front of the scanning disk. This scale enables the accurate location of the spot of light, or rather of the spot occupied by the slit 42 at the moment the glow tube is flashed. Because of the synchronism of the rotation of the scanning disks and of the revolving coil L5, this location will correspond to the orientation of the coil L5 with respect to the coils L3 and L4 at the moment of signal minimum, which in turn, as is a known property of the Bellini Tosi goniometer, indicates the direction of the transmitting station.

If instead of a scanning disk two rotating neon glow tubes are used, 180° apart (on oppositely disposed rotating arms, for instance), it could be arranged to flash only one tube when the auxiliary antenna is used and to flash both when it is not used. Any system with rotating neon tubes, however, has the disadvantage that brushes and moving contact surfaces are required to connect the electric circuit to the rotating glow tubes, thus introducing uncertainty of contact and a source of electrical disturbances.

When no signal is being received, the grid of the relay or trigger tube 180 will not be blocked, or in other words, the grid 182 will "lose control." As a result the resistor 194 and the condenser 190 will cooperate to produce a comparatively rapid series of discharges across the glow tubes. Viewed through the scanning disk these discharges will appear as scattered spots of light distributed around the dial and not maintaining any fixed position. It is an advantage, therefore, that accidental noise will not vary this random effect, while, on the other hand, the tuning in of a signal will darken all of the dial except for the spot or spots indicating the desired bearing.

The system of direction finding embodying my invention and herein described permits readings to be made with great accuracy. The discharge of the condenser 190 through the glow tubes 166 and 168 produces an intense flash of very short duration so that the spot of light observed through the scanning disk is bright and sharply defined and occupies only a small portion of the dial. As a result, not only are readings to an accuracy of 1° possible but also quite high speeds of rotation of the scanning disk and search coil, even in excess of 1000 revolutions per minute, are possible, thus reducing and practically eliminating flickering of the observed luminous spot or point.

In the claims the phrase "signal minimum" is intended to include not only dips in signal amplitude to small values but also dips to zero value. The phrase "directional antenna system" when applied to systems associated with a goniometer unit is intended to include the goniometer unit. Although in the direction finding system herein described the goniometer unit and the scanning disks are preferably driven at exactly the same rotational speed, various different exact timed relationships between the speed of these elements may be employed, e. g. 1:2 or 2:1, and, accordingly, it is intended that the words "synchronism" and "synchronizing" in the claims hereof shall include other suitable exact timed relationships than the preferred one herein shown and described.

This application is a continuation in part of my application Ser. No. 91,404, filed July 18, 1936.

Having described my invention, I claim:

1. In a radio direction finder, the combination of an electrical indicator, a current-storing condenser directly and non-inductively connected to said indicator to supply current thereto, a current source from which current flows to said condenser to charge the same, a control device responsive to a signal impressed on a control electrode thereof to cause said condenser to charge while said signal is so impressed and to discharge through said indicator when said signal is at a minimum, a directional antenna in which voltage of radio frequency current varies in accordance with variations in its relation to a transmitter, a radio receiver which detects said radio frequency current, means which rectifies the receiver output current, means for applying the output of the rectifier to said control electrode, the last mentioned means being effective to smooth the output of said rectifier to maintain said control device in non-conducting condition except when said rectifier output is at a minimum.

2. In a radio direction finder, the combination of an electrical indicator, a current storing condenser directly and non-inductively connected to said indicator to supply current thereto, a current source from which current flows to said condenser to charge the same, an electronic relay having a control grid to cause said condenser to charge while a signal is impressed on said control grid and to discharge while said signal is at a minimum, a directional antenna in which voltage of radio frequency current varies in accordance with variations in its relation to a transmitter, a radio receiver which detects said radio frequency current, means including a filter which rectifies and smooths the receiver output current, and means for utilizing the voltage developed from said output current to operate said control grid to cause release of current from said condenser to said indicator and to prevent release of current from said condenser so that the latter will be charged by said current source.

3. In a radio direction finder, the combination of an electrical indicator, a current-storing condenser directly and non-inductively connected to said indicator to supply current thereto, a current source from which current flows to said condenser to charge the same, a high resistance through which said condenser is charged and which retards reverse flow, a control device in circuit with said condenser and said indicator, a directional antenna in which voltage of radio frequency current varies in accordance with variations in its relation to a transmitter, a radio receiver which detects said radio frequency current, and means including a rectifier and a filter which rectifies and smooths the receiver output current and for utilizing the voltage variations developed from said output current to make said control device non-conducting while a signal is detected by said radio receiver except when the signal is at a minimum, at which time said control device is made conducting and said condenser is allowed to discharge through said control device and said indicator.

4. In a radio direction finder, the combination of an electrical indicator, a current-storing condenser directly and non-inductively connected to said indicator to supply current thereto, a current source from which current flows to said condenser to charge the same, an electronic relay in circuit with said indicator and said condenser and including a control grid, a resistance across the input of said relay, a directional antenna in which a voltage of a radio frequency current varies in accordance with the relation of said antenna to a transmitter, a radio receiver which detects said radio-frequency current, a filter, a rectifier to rectify the receiver output current, said rectifier, filter, and resistance, together utilizing the voltage variations developed therefrom to operate said control grid and prevent release of current from said condenser while a signal is detected in said receiver, so that said condenser will be charged by said current source, except when said signal is at a minimum strength, and to cause release of current from said condenser to said indicator at moments of minimum signal strength.

5. In a radio direction finder, the combination of an electrical indicator, a current storing condenser having one terminal directly and non-inductively connected to said indicator to supply current thereto, a current source from the positive side of which current flows to said condenser to charge the same, a directional antenna, a radio receiver in which signal voltage flowing in said antenna is detected and changed to low frequency current, means for rectifying and smoothing the receiver output current, a discharge tube with at least three electrodes including a control grid upon which said rectified current is negatively impressed, a plate connected to one terminal of said indicator, a cathode connected to the other terminal of said condenser and to the other side of said current source, and a high resistance between the first side of said current source and the first mentioned terminal of said condenser.

6. In a radio direction finder, the combination of an electrical indicator, a current-storing condenser directly and noninductively connected to said indicator to supply current thereto, a current source from which current flows to said condenser to charge the same, a control element to cause flow and non-flow of current from said condenser to said indicator, a directional antenna, a radio receiver which detects radio-frequency current in said antenna and changes the same to a low frequency current, means including a rectifier and a filter into which said low frequency current is fed and which impresses a voltage on said control element so that current to said indicator is alternately stopped and released in response to variations in said low frequency current, and an oscillator independent of signal detection and frequency change in said receiver and which feeds energy into said receiver.

7. In a radio direction finder, the combination of an electrical indicator, a current-storing condenser directly and non-inductively connected to said indicator to supply current thereto, a current source from which current flows to said condenser to charge the same, a control element to cause flow and non-flow of current from said condenser to said indicator, a directional antenna, a radio receiver which detects radio-frequency current in said antenna and changes the same to a low frequency current, means including a rectifier and a filter into which said low frequency current is fed and which impresses a voltage on said control element so that current to said indicator is alternately stopped and released in response to variations in said low frequency current, and means additional to said radio receiver to feed energy to the latter to increase the radio-frequency sensitivity.

8. In a radio direction finder, the combination of an electrical indicator, a scanning disk for viewing said indicator, a current-storing condenser directly and non-inductively connected to said indicator to supply current thereto, a current source from which current flows to said condenser to charge the same, a control device responsive to a signal impressed on a control electrode thereof to cause said condenser to charge while said signal is so impressed and to discharge through said indicator when said signal is at a minimum, a directional antenna system in which the amplitude of radio frequency voltage and current varies in accordance with variations in its relation to a transmitter, said system including an element adapted to be rotated continuously and in synchronism with said scanning disk, means for rotating said element and said scanning disk, a radio receiver which detects said radio frequency current, means which rectifies the receiver output current, means for applying the output of the rectifier to said control electrode, the last mentioned means being effective to smooth the output of said rectifier to maintain said control device in non-conducting condition except when said rectifier output is at a minimum.

9. In a radio direction finder, the combination of an electrical indicator, a scanning disk for viewing said indicator, a current-storing condenser directly and non-inductively connected to said indicator to supply current thereto, a current source from which current flows to said condenser to charge the same, a control device responsive to a signal impressed on a control electrode thereof to cause said condenser to charge while said signal is so impressed and to discharge through said indicator when said signal is at a minimum, a directional antenna system in which the amplitude of radio frequency voltage and current varies in accordance with variation in its relation to a transmitter, said system including a coil adapted to be rotated continuously and in synchronism with said scanning disk, means for rotating and synchronizing said coil and said scanning disk, a radio receiver which detects said radio frequency current, a beat frequency oscillator associated with said radio receiver to cause the generation of a beat frequency signal of a predetermined frequency when the signal is detected, an amplifier including at least one electrical filter network tuned to the said predetermined frequency for amplifying the receiver output, means which rectifies the output of said amplifier, means for applying the output of said rectifier to said control electrode, the last mentioned means being effective to smooth the output of said rectifier to maintain said control device in non-conducting condition except when said rectifier output is at a minimum.

10. In a radio direction finder, the combination of an electrical indicator, a rotatable device for viewing said indicator, a current-storing condenser connected to said indicator to supply current thereto, a current source from which current flows to said condenser to charge the same, a resistance associated with said current source and in circuit with said condenser, a control device responsive to a rectified signal voltage impressed on a control electrode thereof negatively with respect to a cathode thereof to cause said condenser to charge while said signal is so impressed and to discharge through said indicator when said signal is at a minimum, a directional antenna system in which the amplitude of radio frequency voltage and current varies in accordance with variations in its relation to a transmitter, said system including a rotatable element, means for continuously rotating said element and said viewing device, a radio receiver which detects said radio frequency current, means which rectifies the receiver output current, and means including a filter to smooth the output of said rectifying means and to apply said output of said rectifying means to said control electrode to maintain said control device in non-conducting condition except when said rectifier output is at a minimum, at which time said control device is made conducting and said condenser is allowed to discharge through said control device and said indicator.

11. In a radio direction finder, the combination of an electrical indicator, a current-storing condenser connected to said indicator to supply current thereto, a current source from which current flows to said condenser to charge the same, a control device responsive to a signal impressed on a control electrode thereof to cause said condenser to charge while said signal is so impressed and to discharge through said indicator when said signal is at a minimum, a directional antenna in which the amplitude of radio frequency voltage and current varies in accordance with variations in its relation to a transmitter, a radio receiver which detects said radio frequency signal, means associated with said receiver for causing said signal to vary in amplitude at a predetermined frequency so that a transformed signal of said predetermined frequency may be detected, means which rectifies the receiver output current, and means including a filter to smooth the output of said rectifying means and to apply said output of said rectifying means to said control electrode to maintain said control device in non-conducting condition except when said rectifier output is at a minimum, at which time said control device is made conducting and said condenser is allowed to discharge through said control device and said indicator.

12. In a radio direction finder, the combination of an electrical indicator, a current-storing condenser directly and non-inductively connected to said indicator to supply current thereto, a current source from which current flows to said condenser to charge the same, a control device responsive to a signal impressed on a control electrode thereof to cause said condenser to charge while said signal is so impressed and to discharge through said indicator when said signal is at a minimum, a directional antenna in which the amplitude of radio frequency voltage and current varies in accordance with variations in its relation to a transmitter, a radio receiver which detects said radio frequency signal, means associated with said receiver for causing said signal to vary in amplitude at a predetermined frequency so that a transformed signal of said predetermined frequency may be detected, a selective amplifier tuned to said predetermined frequency and including at least one electrical filter adapted to pass readily said predetermined frequency and to reduce the intensity of extraneous noise, means which rectifies the receiver output current, and means including a filter to smooth the output of said rectifying means and to apply said output of said rectifying means to said control electrode to maintain said control device in non-conducting condition except when said rectifier output is at a minimum, at which time said control device is made conducting and said condenser is allowed to discharge through said control device and said indicator.

13. In a radio direction finder, the combination of a plurality of electrical indicators, rotatable devices for viewing each of said indicators, a current-storing condenser directly and non-inductively connected to said indicators to supply current thereto, a current source from which current flows to said condenser to charge the same, a control device responsive to a signal impressed on a control electrode thereof to cause said condenser to charge while said signal is so impressed and to discharge through said indicators when said signal is at a minimum, a directional antenna system in which the amplitude of radio frequency voltage and current varies in accordance with variations in its relation to a transmitter, said system including an element adapted to be rotated, means for rotating said element, means for rotating said viewing devices in a predetermined relationship with the rotation of said element, the means for rotating at least one of said viewing devices comprising a synchronous motor electrically connected in an electrical synchronizing system with a generator which is mechanically coupled with and driven by the means which rotates said rotatable element of said antenna system, a radio receiver which detects said radio frequency current, means which rectifies the receiver output current, and means including a filter to smooth the output of said rectifying means and to apply said output of said rectifying means to said control electrode to maintain said control device in non-conducting condition except when said rectifier output is at a minimum, at which time said control device is made conducting and said condenser is allowed to discharge through said control device and said indicators.

14. In a radio direction finder, the combination of a plurality of electrical indicators, rotatable devices for viewing each of said indicators, a current-storing condenser directly and non-inductively connected to said indicators to supply current thereto, a current source from which current flows to said condenser to charge the same, a control device responsive to a signal impressed on a control electrode thereof to cause said condenser to charge while said signal is so impressed and to discharge through said indicators when said signal is at a minimum, a directional antenna system in which the amplitude of radio frequency voltage and current varies in accordance with variations in its relation to a transmitter, said system including an element adapted to be rotated, means for continuously rotating said element and for rotating in synchronism therewith an electric generator and at least one of said viewing devices, at least one synchronous motor fed by said generator for rotating at least one other of said viewing devices, said generator and motor being adapted to synchronize the rotation of a viewing device driven by said motor with the rotation of said antenna system element, a radio receiver which detects said radio frequency current, means which rectifies the receiver output current, and means including a filter to smooth the output of said rectifying means and to apply said output of said rectifying means to said control electrode to maintain said control device in non-conducting condition except when said rectifier output is at a minimum, at which time said control device is made conducting and said condenser is allowed to discharge through said control device and said indicators.

15. In a radio direction finder, the combination of a plurality of electrical indicators, rotatable devices for viewing each of said indicators, a current-storing condenser directly and non-inductively connected to said indicators to supply current thereto, a current source from which current flows to said condenser to charge the same, a control device responsive to a signal impressed on a control electrode thereof to cause said condenser to charge while said signal is so impressed and to discharge through said indicators when said signal is at a minimum, a directional antenna system in which the amplitude of radio frequency voltage and current varies in accordance with variations in its relation to a transmitter, said system including an element adapted to be rotated, means for rotating said element, means for rotating said viewing devices in a predetermined relationship with the rotation of said element, the means for rotating at least one of said viewing devices comprising a synchronous motor electrically connected in an electrical synchronizing system with a generator which is mechanically coupled with and driven by the means which rotates said rotatable element of said antenna system, a radio receiver which detects said radio frequency signal, means associated with said receiver for causing said signal to vary in amplitude at a predetermined frequency so that a transformed signal of said predetermined frequency may be detected, means which rectifies the receiver output current, and means including a filter to smooth the output of said rectifying means and to apply said output of said rectifying means to said control electrode to maintain said control device in non-conducting condition except when said rectifier output is at a minimum, at which time said control device is made conducting and said condenser is allowed to discharge through said control device and said indicators.

16. In a radio direction finder, the combination of an electrical indicator, a current storing condenser directly and non-inductively connected to said indicator to supply current thereto, a current source from which current flows from said condenser to charge the same, an electronic relay having a control electrode to cause said condenser to charge while a signal is impressed on said control electrode and to discharge while said signal is at a minimum, a directional antenna in which the amplitude of radio frequency voltage and current varies in accordance with variations in its relation to a transmitter, a radio receiver which detects said radio frequency current, a beat frequency oscillator associated with said radio receiver to cause the generation of a beat frequency signal of a predetermined frequency when the signal is detected, an amplifier including at least one band pass filter tuned to said predetermined frequency for amplifying the receiver output, means including a filter which rectifies and smooths the output of said amplifier, and means for utilizing the voltage developed from said output current to operate said control electrode to cause release of current from said condenser to said indicator and to prevent release of current from said condenser so that the latter will be charged by said current source.

17. In a radio direction finder, the combination of an electrical indicator, a rotatable viewing device for viewing said indicator, a current-storing condenser directly and non-inductively connected to said indicator to supply current thereto, a current source from which current flows to said condenser to charge the same, an electronic relay having a control grid to cause said condenser to charge while a signal is impressed on said control grid and to discharge while said signal is at a minimum, a directional antenna system in which the amplitude of radio frequency voltage and current varies in accordance with variations in its relation to a transmitter, said system including an element adapted to be rotated continuously and in synchronism with said viewing device, means for rotating and synchronizing said element and said viewing device, a radio receiver which detects said radio frequency current, a beat frequency oscillator associated with said radio receiver to cause the generation of a beat frequency signal of a predetermined frequency when a signal is detected, an amplifier tuned to the said predetermined frequency for amplifying the receiver output, means including a filter which rectifies and smooths output current of said amplifier, and means for utilizing the voltage developed from said output current to operate said control grid to cause release of current from said condenser to said indicator and to prevent release of current from said condenser so that the latter will be charged by said current source.

18. In a radio direction finder, the combination of an electrical indicator, a current-storing condenser directly and non-inductively connected to said indicator to supply current thereto, a current source from which current flows to said condenser to charge the same, a resistance through which said condenser is charged, a control device in circuit with said condenser and said indicator, a directional antenna in which the amplitude of radio frequency signal current and voltage varies in accordance with variations in its relation to a transmitter, a radio receiver which detects said radio frequency signal, means for causing the said signal to vary in amplitude at a predetermined frequency so that a transformed signal of said predetermined frequency may be detected, a selective amplifier tuned to said predetermined frequency for amplifying said transformed signal, and means including a rectifier and a filter which rectifies and smooths the output current of said amplifier and for utilizing the voltage variations developed from said output current to make said control device non-conducting while a signal is detected by said radio receiver except when the signal is at a minimum, at which time said control device is made conducting and said condenser is allowed to discharge through said control device and said indicator.

19. In a radio direction finder, the combination of an electrical indicator, a rotatable viewing device for viewing said indicator, a current-storing condenser directly and non-inductively connected to said indicator to supply current thereto, a current source from which current flows to said condenser to charge the same, a resistance through which said condenser is charged, a control device in circuit with said condenser and said indicator, a directional antenna system in which the amplitude of radio frequency current and voltage varies in accordance with variations in its relation to a transmitter, said system including a coil adapted to be rotated continuously, means for rotating said coil, means for rotating said viewing device in synchronism with said element, a radio receiver which detects said radio frequency current, a beat frequency oscillator associated with said radio receiver to cause the generation of a beat frequency signal of a predetermined frequency when a signal is detected, an amplifier tuned to the said predetermined frequency for amplifying the receiver output, and means including a rectifier and a filter which rectifies and smooths the output current of said amplifier and for utilizing the voltage variations developed from said output current to make said control device non-conducting while a signal is detected by said radio receiver except when the signal is at a minimum, at which time said control device is made conducting and said condenser is allowed to discharge through said control device and said indicator.

20. In a radio direction finder, the combination of an electrical indicator, a current-storing condenser directly and non-inductively connected to said indicator to supply current thereto, a current source from which current flows to said condenser to charge the same, a resistance through which said condenser is charged, a control device in circuit with said condenser and said indicator, a directional antenna in which the amplitude of radio frequency current and voltage varies in accordance with its relation to a transmitter, a radio receiver which detects said radio frequency current, a beat frequency oscillator associated with said radio receiver to cause the generation of a beat frequency signal of a predetermined frequency when the signal is detected, an amplifier for amplifying the receiver output and including at least one electrical filter network tuned to the said predetermined frequency, means including a filter which rectifies and smooths the output current of said amplifier and for utilizing the voltage variations developed from said output current to make said control device non-conducting while a signal is detected by said receiver except when the signal is at a minimum, at which time said control device is made conducting and said condenser is allowed to discharge through said control device and said indicator.

21. In a radio direction finder, the combination of an electrical indicator, a rotating viewing device associated with said indicator, a current-storing condenser connected to said indicator to supply current thereto, a current source from which current flows to said condenser to charge the same, an electronic relay having a control grid to cause said condenser to charge while a signal is impressed on said control grid and to discharge while said signal is at a minimum, a directional antenna system in which the amplitude of radio frequency voltage and current varies in accordance with variations in its relation to a transmitter, said system including an element adapted to be continuously rotated in synchronism with said viewing device, means for rotating said element and means for synchronizing the rotation of said element and of said device, a radio receiver which detects said radio frequency current, a filter, a rectifier to rectify the receiver output current, said rectifier and filter together utilizing the voltage variations developed therefrom to operate said control grid and prevent release of current from said condenser while a signal is detected in said receiver, so that said condenser will be charged by said current source, except when said signal is at a minimum strength, and to cause release of current from said condenser to said indicator at moments of minimum signal strength.

22. In a radio direction finder, the combination of an electrical indicator, a current-storing condenser directly and non-inductively connected to said indicator to supply current thereto, a current source from which current flows to said condenser to charge the same, a control element to cause flow and non-flow of current from said condenser to said indicator, a directional antenna, a radio receiver which detects radio frequency current in said antenna and changes the same to a low frequency current, an oscillator associated with said receiver independent of signal detection and said frequency change adapted to feed energy into said receiver to produce a further frequency change, means for amplifying, rectifying and filtering the output of said receiver and for impressing a voltage on said control element, said voltage on said control element alternately causing stoppage and release of the flow of current from said condenser to said indicator at moments determined by the variation in the amplitude of said receiver output.

23. In a radio direction finder, the combination of an electrical indicator, a current-storing condenser directly and non-inductively connected to said indicator to supply current thereto, a current source from which current flows to said condenser to charge the same, a control element to cause flow and non-flow of current from said condenser to said indicator, a directional antenna, a radio receiver which detects radio frequency current in said antenna and changes the same to a low frequency current, means including a rectifier and a filter into which said low frequency current is fed and which impresses a voltage on said control element so that current to said indicator is alternately stopped and released in response to variations in said low frequency current, means additional to said radio receiver to feed energy to the latter to increase the radio frequency sensitivity, and a rectifier and a filter interposed between said radio receiver and said control element.

FRANCIS W. DANE.